UNITED STATES PATENT OFFICE 2,288,863

PROCESS FOR THE MANUFACTURE OF SUBSTITUTED AMIDES OF 3,5-DIMETHYL-ISOXAZOLE-4-CARBOXYLIC ACID

Wilhelm Wenner, Basel, Switzerland, assignor to Hoffman-La Roche Inc., Nutley, N. J., a corporation of New Jersey No Drawing. Application January 2, 1941, Serial No. 372,942. In Switzerland February 27, 1940

4 Claims. (Cl. 260—307)

Substituted amides of 3,5-dimethyl-isoxazole-4-carboxylic acid have proved to be excellent analeptics (U. S. Patent No. 2,115,681).

For the preparation of these compounds there have so far been two ways, both starting from acetoacetic ester. In both cases 3,5-dimethyl-isoxazole-4-carboxylic acid ethyl ester is obtained as an intermediate product. This must be saponified, and the resulting acid transformed into a derivative capable of reacting with amines and reacted with the amine.

It has now been found that the substituted amides of 3,5-dimethyl-isoxazole-4-carboxylic acid can be obtained directly by using substituted amides of acetoacetic acid. Thereby, a considerable simplification in the manufacture of these important compounds is achieved, inasmuch as the above-mentioned last three stages become superfluous.

Substituted amides of acetoacetic acid of the formula

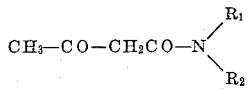

wherein $R_1$ represents hydrogen, alkyl, aralkyl; $R_2$ alkyl, aralkyl, cycloalkyl; and in which the group

can also represent a ring system, such as piperidyl, α-methylpiperidyl, morpholyl are used as starting materials. These compounds are reacted with ethylene-diamine, the resulting ethylene-diamino-bis-crotonic acid amide is acetylated and hydroxylamine is caused to act on the acetyl compounds. The reaction proceeds according to the following formulae:

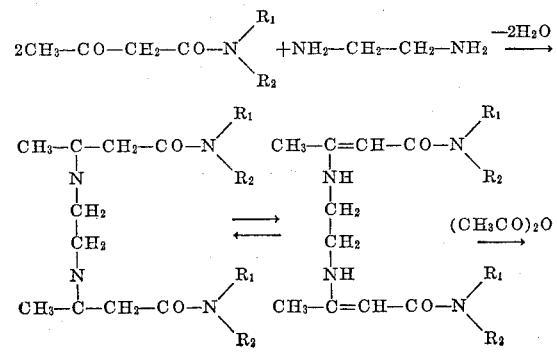

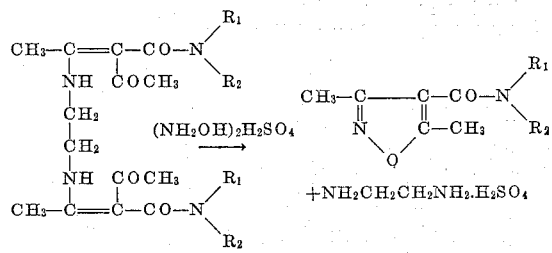

The amides needed as starting materials can be manufactured in different ways. The amide of the formula $$CH_3—CO—CH_2—CO—NH—CH_2C_6H_5$$

for instance, is obtainable by reacting β-chloro-crotonic acid chloride with benzyl amine and substituting in the β-chloro-crotonic acid benzyl amide the chlorine atom by the OH radical. A very useful method for the manufacture of substituted acetoacetic acid amides is the reaction of diketene with amines; thus, for instance, acetoacetic acid piperidide results from the action of piperidine on diketene, and acetoacetic acid cyclohexylamide from reacting cyclohexylamide with diketene. By these two methods all amides included in the general formula in the above paragraph 3 can be manufactured and by using the reaction of the present invention the corresponding substituted amides of 3,5-dimethyl-isoxazole-4-carboxylic acid can always be obtained.

Example 1

31.4 parts by weight of acetoacetic diethylamide (bp₁₀ 121–122° C.) are treated with 15 parts by weight of alcohol and 8 parts by weight of ethylene-diamine hydrate. The mixture becomes slightly warm. After standing, ethylene-diamino-bis-(crotonic acid diethylamide) of melting point 119° C. crystallises out. 10 parts by weight of this compound are acetylated by heating for 6 hours to 90° C. with 7 parts by weight of acetic anhydride. To the acetylated mixture a solution of 7 parts by weight of hydroxylamine sulphate in 20 parts by weight of water is added, followed by 50 parts by weight of methanol and the product boiled for an hour. The methyl-alcohol is then distilled off and the residue treated with concentrated alkali. The 3,5-dimethyl-isoxazole-4-carboxylic acid diethylamide separates as an oil. It is isolated and purified by distillation. 3,5-dimethyl-isoxazole-4-carboxylic acid diethylamide of bp₁₀ 143° C. is obtained in good yield.

Example 2

40 parts by weight of acetoacetic acid-di-n-propylamide are dissolved in 15 parts by weight of alcohol and 8 parts by weight of ethylene-diamine hydrate added. After allowing the product to stand for one day, ethylene-diamino-bis-(crotonic acid-di-n-propylamide) has precipitated in crystalline form. 4 parts by weight thereof are heated for several hours to 100° C. with 2.2 parts by weight of acetic anhydride. The acetylated mixture is added to a boiling solution of 1.8 parts by weight of hydroxylamine sulphate in 3.5 parts by weight of water and 5 parts by weight of methyl-alcohol. After boiling for 2 hours, the methyl-alcohol is distilled off and the residue treated with an excess of concentrated alkali. It is extracted with ether, the ether solution evaporated and the residue distilled. 3,5-dimethyl-isoxazole - 4 - carboxylic acid-di-n-propylamide is obtained as a light-yellow oil of bp$_{10}$ 168–170° C., having a bitter taste.

Example 3

382 parts by weight of acetoacetic-(N-methyl)-anilide are dissolved in 200 parts by weight of ethyl-alcohol and 80 parts by weight of ethylene-diamine hydrate added. After allowing the product to stand for some time, the ethylene-diamino compound crystallises out and is sucked off. 406 parts by weight thereof are acetylated with 240 parts by weight of acetic anhydride. The acetylated mixture is added to a solution of 200 parts by weight of hydroxylamine sulphate in 1000 parts by weight of 50 per cent alcohol at about 60° C. After boiling for an hour, the alcohol is distilled off and the product treated with an excess of concentrated caustic soda solution. The separated oil is taken up in ether. After driving off the ether, the product is distilled in vacuo. 3,5-dimethyl-isoxazole-4-carboxylic acid-(N-methyl)-anilide of bp$_{10}$ 196–198° C. is obtained which, after standing awhile, solidifies to form crystals melting at 42–43° C.

Example 4

39.4 parts by weight of acetoacetic-α-methylpiperidide are dissolved in 100 parts by weight of ethyl-alcohol and 8 parts by weight of ethylene-diamine hydrate added. After allowing the product to stand for several hours, ethylene-diamino-bis-(crotonic acid-α-methylpiperidide) separates. 3.9 parts by weight thereof are heated for 5 hours to 90° C. with 2.4 parts by weight of acetic anhydride. The acetylated mixture is added to a solution of 2 parts by weight of hydroxylamine sulphate in 6 parts by weight of water and 10 parts by weight of methanol. The whole is boiled for 2 hours while stirring. After cooling, the ethylene-diamine sulphate is sucked off, the filtrate is treated with excess alkali and extracted with ether. The ether is evaporated and the residue distilled in vacuo. 3,5-dimethyl-isoxazole-4-carboxylic acid-α-methylpiperidide is obtained as a colourless oil of bp$_{11}$ 189–190° C. It solidifies on standing and then has a melting point of 44–45° C.

I claim:

1. Process for the manufacture of substituted amides of 3,5-dimethyl-isoxazole-4-carboxylic acid, comprising reacting substituted acetoacetic acid amides of the formula

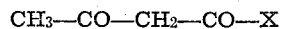

wherein X is selected from the group consisting of the radical

R$_1$ being selected from the group consisting of hydrogen, alkyl hydrocarbon radicals, and aralkyl hydrocarbon radicals and R$_2$ is selected from the group consisting of alkyl hydrocarbon radicals, aryl hydrocarbon radicals, aralkyl hydrocarbon radicals and cycloalkyl hydrocarbon radicals, and a heterocyclic ring system containing at least one nitrogen atom as a member of the ring, the ring being attached to the acetoacetic acid radical by the said nitrogen atom, with ethylene-diamine, acetylating the resulting ethylene-diamino-bis-(crotonic acid amides) and causing hydroxylamine to act on the acetyl compounds.

2. Process for the manufacture of 3,5-dimethyl-isoxazole-4-carboxylic acid diethylamide, comprising reacting acetoacetic acid diethylamide with ethylene-diamine, acetylating the resulting ethylene-diamino-bis-(crotonic acid diethylamide) and causing hydroxylamine to act on the acetyl compound.

3. Process for the manufacture of 3,5-dimethyl-isoxazole-4-carboxylic acid α-methylpiperidide, comprising reacting acetoacetic acid α-methylpiperidide with ethylene-diamine, acetylating the resulting ethylene-diamino-bis-(crotonic acid α-methylpiperidide) and causing hydroxylamine to act on the acetyl compound.

4. Process for the manufacture of 3,5-dimethyl-isoxazole-4-carboxylic acid-(N-methyl)-anilide, comprising reacting acetoacetic acid-N-methyl-anilide with ethylene-diamine, acetylating the resulting ethylene-diamino-bis-[crotonic acid-(N-methyl)-anilide] and causing hydroxylamine to act on the acetyl compound.

WILHELM WENNER.